(No Model.)
A. G. HILL.
CARRIAGE AXLE BOX.
No. 432,199. Patented July 15, 1890.
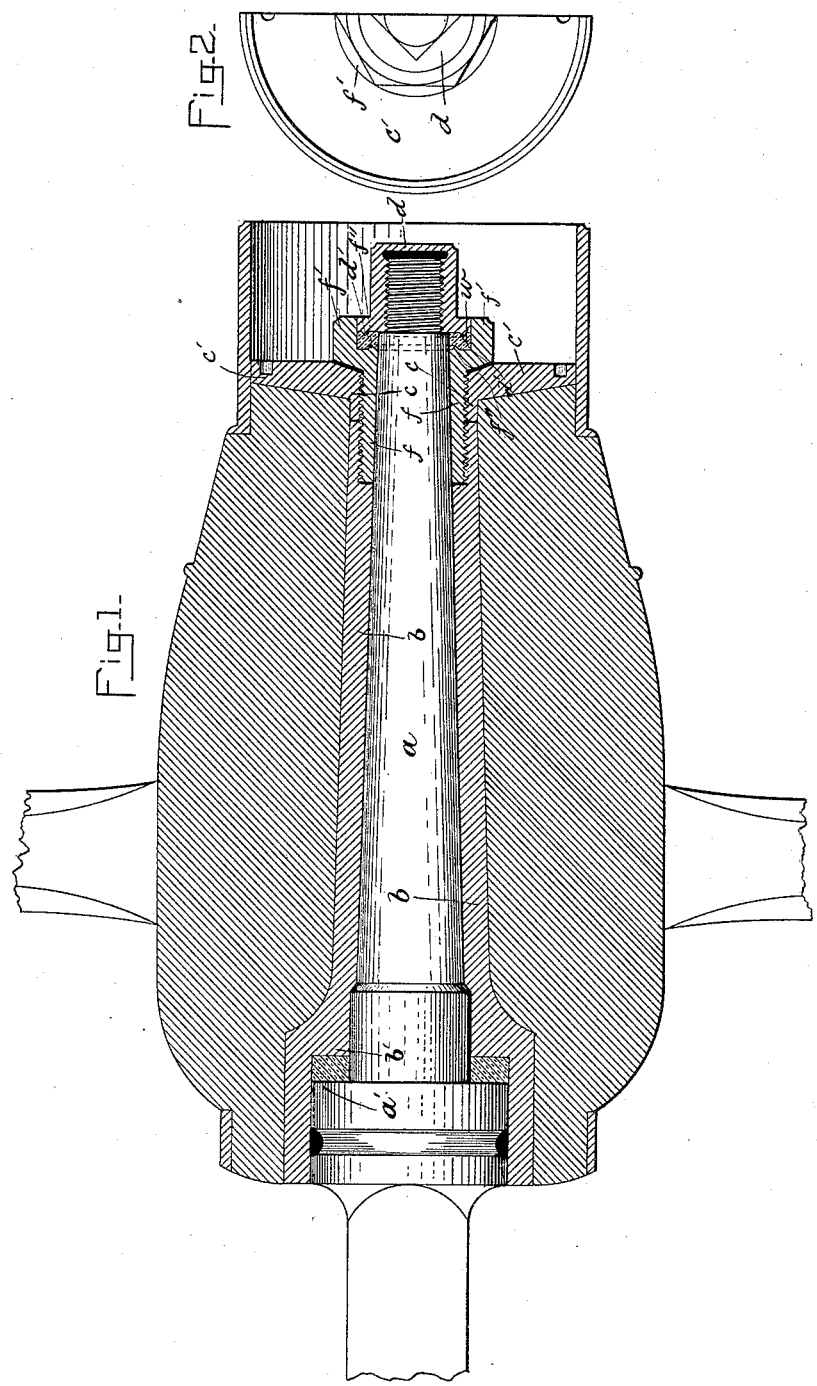
WITNESSES:
INVENTOR:

UNITED STATES PATENT OFFICE.

ASA G. HILL, OF STONEHAM, MASSACHUSETTS.

CARRIAGE-AXLE BOX.

SPECIFICATION forming part of Letters Patent No. 432,199, dated July 15, 1890.

Application filed April 24, 1890. Serial No. 349,304. (No model.)

*To all whom it may concern:*

Be it known that I, ASA G. HILL, of Stoneham, in the county of Middlesex and State of Massachusetts, have invented certain new and useful Improvements in Carriage-Axles and Boxes Therefor, of which the following is a specification.

This invention relates to carriage-axles, and it has for its object to provide an axle-box which shall prevent end shake and rattle of an axle therein, and which is also adapted to prevent oil from leaking at the outer end thereof and saturating the wooden hub of a wheel and thereby loosening the spokes.

The invention consists, first, in the combination of an axle-box which is internally screw-threaded at its outer end, an externally-threaded sleeve screwed into said end and constituting an adjustable extension of the axle-box, and a jam-nut on said sleeve adapted to be turned up against the end of the box to hold the sleeve or extension at any point to which it may be adjusted, the sleeve being adapted to be adjusted outwardly against or toward the usual nut on the outer end of the axle-arm to take up end shake or rattle caused by wear of the end of the box or of the inner face of the axle-nut or of the washer interposed between said parts.

The invention also consists in the combination, with an axle-arm, of a nut screwed on the outer end thereof and provided with an annular rib on its inner end, the axle-box having an annular rib on its outer end, and a compressible washer interposed between said box and nut, said washer being indented by the two annular ribs, whereby leakage of oil from the interior of the box is prevented, all of which I will now proceed to describe.

In the accompanying drawings, forming a part of this specification, Figure 1 represents a longitudinal section of an axle and axle-box embodying my invention. Fig. 2 represents an end view of the same.

In the drawings, $a$ represents one arm of an axle, of the usual or any suitable form, having a shoulder $a'$ and being screw-threaded at its outer end to engage the usual screw-threaded nut or cap $d$.

$b$ represents an axle-box, which has a shoulder at $b'$ to correspond to the shoulder $a'$ of the axle $a$. A leather washer is introduced, as usual, between said shoulders $a'$ and $b'$ in order to make a tight joint between the said shoulders when the axle-box $b$ is in place on the axle-arm $a$. Said axle-box $b$ is internally screw-threaded at its outer end to engage the externally screw-threaded sleeve $f$, which forms an extension of the axle-box. The box $b$ is made shorter than the bearing portion of the axle-arm, so that there is room between the outer end and the axle nut or cap $d$ for the sleeve $f$. The externally screw-threaded portion of the sleeve $f$, engaged with the internal screw-thread of the axle-box proper, is adapted to form an extension of the axle-box. It is also adapted to be adjusted so as to make the axle-box of different lengths, which is done by screwing it out of the axle-box to make it longer, and thus compensate for the shortening of the box by wear, and by screwing it in when required to make it shorter.

In order to firmly fix the sleeve $f$ in any position in which it may be desired with respect to the axle-box proper $b$, I provide a jam-nut $c$, engaged with the external screw-threaded portion of the sleeve $f$ and adapted to bear against the end of the axle-box proper $b$, and thereby hold the sleeve $f$ firmly in any position in which it may be adjusted with respect to the axle-box proper $b$. Said jam-nut $c$ is provided with a beveled flange $c'$, on the outer side of which are two holes adapted to receive the prongs of a wrench, whereby said jam-nut may be loosened from its bearing on the end of the axle-box proper when it is required to adjust the sleeve $f$ and tightened when said sleeve has been adjusted to its required length. It will be seen that by the use of said adjustable sleeve $f$ and of said jam-nut $c$ all end shake or rattle of the axle $a$ in the axle-box may be prevented. When it is found that from wear of washers or of the axle or axle-box or from any other cause the axle is shaking endwise in said axle-box, the jam-nut $c$ is slightly unscrewed. The sleeve $f$ may then be screwed outwardly until it takes up the end play caused by wear by lengthening or extending the box as a whole, (the said sleeve $f$ constituting an extension of the axle-box.) The jam-nut is then screwed tight against the outer end of the axle-box $b$, thus firmly securing the sleeve $f$ in the position to which it was last adjusted.

By the above-described devices it will be seen that all end shake or rattle will be prevented and a firm and tight joint maintained at each end between the axle and axle-box.

The sleeve $f$ has at its outer end the recessed enlargement or head $f'$, which is adapted to receive the usual nut or cap $d$, and is made polygonal on its exterior so that it can be grasped and rotated by a wrench. On the inner end of the nut $d$ is an annular lip $d'$. On the surface of the sleeve $f$, opposing the nut or cap $d$, is a similar annular lip $f''$. When the sleeve $f$ and the nut or cap $d$ are respectively engaged with the axle-box and axle, said annular lips $f''$ and $d'$ are of course concentric; but the circle of the lip $d'$ is of larger diameter than that of the lip $f''$; hence when the cap or nut $d$ is screwed up so that its inner end will bear upon the surface of the sleeve $f$ the said annular lips $d'$ $f''$ will overlap each other. A leather washer $w$ is introduced between said cap or nut $d$ and the sleeve $f$, and when the cap $d$ is screwed up tight said washer, being held between the overlapping annular lips $d'$ and $f''$, will make a tight joint, which will prevent the leakage of oil from the outer end of the axle-arm and the consequent damage to the hub and spokes of a wheel by saturation with oil. The adjustability of the sleeve $f$ enables its rib or lip $f''$ to be set out toward the nut $d$ from time to time to enable the latter to increase the compression of the washer, so that when the washer has been compressed so long that it has no tendency to expand and make a tight joint it may be additionally compressed to tighten the joint.

I claim—

1. In an axle-box, the combination of the main section $b$, made shorter than the bearing portion of the axle-arm and provided with an internally screw-threaded recess at its outer end, the externally-threaded sleeve or extension $f$, formed to engage the internal thread of the said recess and constituting the outer end of the box, said box being adjustable in length by the rotation of the said outer end, and a check or jam nut engaged with the external thread of the sleeve $f$ and adapted to be turned up against the outer end of the main section of the box to hold the adjustable sleeve or extension at any position to which it may be adjusted, as set forth.

2. The combination of the main box-section $b$, having an internal screw-thread in its outer end, the externally-threaded sleeve or extension $f$, and the check or jam nut engaged with the threaded sleeve and provided with an outwardly-projecting flange at its outer end having orifices to engage the prongs of a wrench or spanner, as set forth.

3. The combination of the axle-arm, the nut $d$, screwed upon the outer end of the arm and provided with an annular rib on its inner end, the axle-box composed of the main section $a$ and the adjustable sleeve or extension $f$, the latter having an annular rib on its outer end of different diameter from the rib on the inner end of the nut, and a compressible washer interposed between the outer end of the sleeve $f$ and the inner end of the nut, said washer being indented by said ribs, whereby leakage of oil from the interior of the box is prevented, the adjustability of the sleeve $f$ enabling its rib to be set out toward the nut to permit increased compression of the washer from time to time, as set forth.

In testimony whereof I have signed my name to this specification, in the presence of two subscribing witnesses, this 22d day of April, A. D. 1890.

ASA G. HILL.

Witnesses:
C. F. BROWN,
A. D. HARRISON.